United States Patent
Zhang et al.

(10) Patent No.: US 11,799,944 B1
(45) Date of Patent: Oct. 24, 2023

(54) INTELLIGENT MULTI-PATH CALL HOME

(71) Applicant: Lenovo Enteprise Solutions (Singapore) Pte. Ltd., New Tech Park (SG)

(72) Inventors: Caihong Zhang, Shanghai (CN); Fred Allison Bower, III, Durham, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/082,068

(22) Filed: Dec. 15, 2022

(51) Int. Cl.
 *G06F 15/173* (2006.01)
 *H04L 67/025* (2022.01)
 *H04L 67/1029* (2022.01)

(52) U.S. Cl.
 CPC ........ *H04L 67/025* (2013.01); *H04L 67/1029* (2013.01)

(58) Field of Classification Search
 CPC ............................ H04L 67/025; H04L 67/1029
 See application file for complete search history.

(56) References Cited

U.S. PATENT DOCUMENTS

| 9,444,703 | B1* | 9/2016 | Goldberg | H04L 43/065 |
| 2021/0117515 | A1* | 4/2021 | Bartfai-Walcott | G06F 21/105 |
| 2023/0161659 | A1* | 5/2023 | Misra | G06F 11/079 |
| | | | | 714/48 |

* cited by examiner

Primary Examiner — Richard G Keehn
(74) Attorney, Agent, or Firm — Kunzler Bean & Adamson; Bruce R. Needham

(57) ABSTRACT

A method for an intelligent multi-path call home includes detecting, at a BMC, an error in a computing device managed by the BMC and sending a call home message to a management server. The computing device is one of a plurality of computing devices each with a BMC in communication with the management server. The management server is programmed to relay the call home message to a call home destination remote from the computing devices and management server. The method includes determining that the management server failed to receive the call home message and/or failed to successfully relay the call home message to the call home destination, and transmitting, from the BMC, the call home message to the call home destination in response to determining that the management server failed to receive the call home message and/or failed to successfully relay the call home message to the call home destination.

20 Claims, 6 Drawing Sheets

INTELLIGENT MULTI-PATH CALL HOME

FIELD

The subject matter disclosed herein relates to failure detection and more particularly relates to an intelligent multi-path call home function in baseboard management controllers.

BACKGROUND

When an error is detected in a computing device of a datacenter or other location managed by baseboard management controllers ("BMCs") over a management network, a useful function of the BMC is to send information about the error to a call home destination for analysis by a system administrator. This call home function is typically service data gathered by a BMC and sent to a preferred service provider. For example, the service provider may be a Lenovo® Support Center. In some embodiments, the call home message is sent using a Secure File Transfer Protocol ("SFTP"). The service center and personnel receiving call home messages, in some embodiments, are able to respond to call home messages by filling out a service ticket, ordering equipment, sending repair personnel, etc. However, in some instances when a BMC tries to send information, a management server at the datacenter may not be able to relay the information to the call home destination.

BRIEF SUMMARY

A method for an intelligent multi-path call home is disclosed. An apparatus and computer program product also perform the functions of the method. The method includes detecting, at a BMC, an error in a computing device managed by the BMC and sending, from the BMC, a call home message to a management server. The computing device is one of a plurality of computing devices each with a BMC in communication with the management server. The management server is programmed to relay the call home message to a call home destination remote from the computing devices and management server. The method includes determining, at the BMC, that the management server failed to receive the call home message and/or failed to successfully relay the call home message to the call home destination, and transmitting, from the BMC, the call home message to the call home destination in response to determining that the management server failed to receive the call home message and/or failed to successfully relay the call home message to the call home destination.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
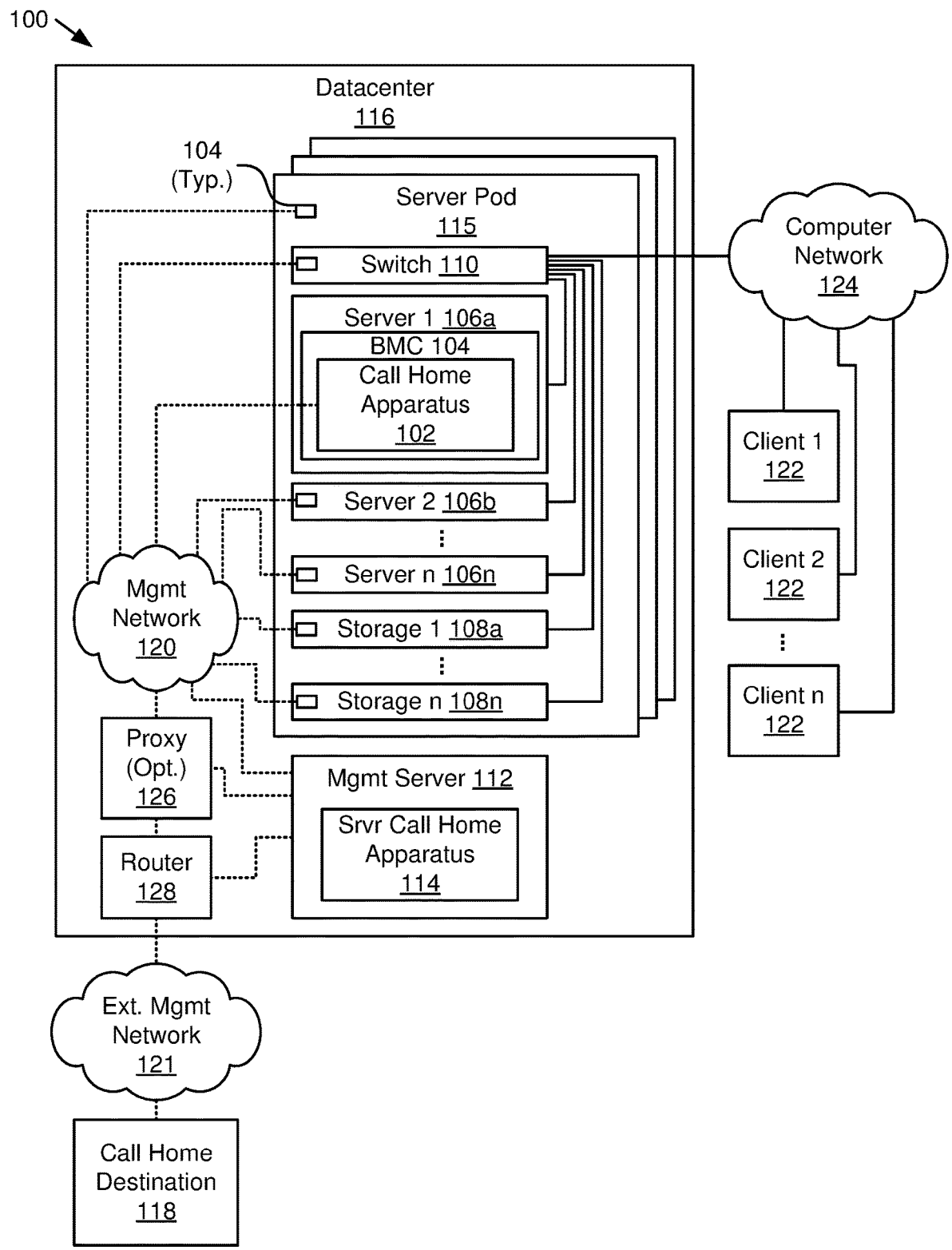
FIG. 1A is a schematic block diagram illustrating a system for an intelligent multi-path call home, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for an intelligent multi-path call home is disclosed. The method includes detecting, at a BMC, an error in a computing device managed by the BMC and sending, from the BMC, a call home message to a management server. The computing device is one of a plurality of computing devices each with a BMC in communication with the management server. The management server is programmed to relay the call home message to a call home destination remote from the computing devices and management server. The method includes determining, at the BMC, that the management server failed to receive the call home message and/or failed to successfully relay the call home message to the call home destination, and transmitting, from the BMC, the call home message to the call home destination in response to determining that the management server failed to receive the call home message and/or failed to successfully relay the call home message to the call home destination.

In some embodiments, determining that the management server failed to receive the call home message and/or failed to successfully relay the call home message to the call home destination includes the BMC determining that transmission of the call home message to the management server failed. In other embodiments, determining that the management server failed to receive the call home message and/or failed to successfully relay the call home message to the call home destination includes the BMC failing to receive a message from the management server that the call home message was successfully relayed to the call home destination.

In some embodiments, transmitting, from the BMC, the call home message to the call home destination includes transmitting the call home message independent from the management server. In other embodiments, transmitting, from the BMC, the call home message to the call home destination includes transmitting the call home message to a proxy. The proxy relays the call home message to the call home destination. In other embodiments, transmitting, from the BMC, the call home message to the call home destination includes transmitting the call home message to a router in communication with the call home destination.

In some embodiments, the method includes receiving, at the BMC, call home instructions from the management server. The call home instructions include an address of the call home destination, instructions for transmitting the call home message independent from the management server, and/or code to install the call home instructions on the BMC. In other embodiments, the BMC communicates with the management server and the call home destination over a management network separate from a network used by the computing devices to transmit data.

In some embodiments, the BMC is a first BMC, the management server is a first management server of a plurality of first management servers and a second management server is in communication with each of the first management servers. Each first management server is in communication with a plurality of BMCs, each within a computing device. The first management server in communication with the first BMC relays the call home message received from the first BMC to the second management server and the second management server relays the call home message to the call home destination. In the embodiments, determining, at the first BMC, that the management server failed to receive the call home message and/or failed to successfully relay the call home message to the call home destination includes determining that the first management server and/or the second management server failed to receive the call home message, and/or the second management server failed to successfully relay the call home message to the call home destination.

An apparatus for an intelligent multi-path call home includes a processor and non-transitory computer readable storage media storing code. The code is executable by the processor to perform operations that include detecting, at a BMC, an error in a computing device managed by the BMC and sending, from the BMC, a call home message to a management server. The computing device includes one of a plurality of computing devices each with a BMC in communication with the management server. The management server is programmed to relay the call home message to a call home destination remote from the computing devices and management server. The operations include determining, at the BMC, that the management server failed to receive the call home message and/or failed to successfully relay the call home message to the call home destination and transmitting, from the BMC, the call home message to the call home destination in response to determining that the management server failed to receive the call home message and/or failed to successfully relay the call home message to the call home destination.

In some embodiments, determining that the management server failed to receive the call home message and/or failed to successfully relay the call home message to the call home destination includes the BMC determining that transmission of the call home message to the management server failed. In other embodiments, determining that the management server failed to receive the call home message and/or failed to successfully relay the call home message to the call home destination includes the BMC failing to receive a message from the management server that the call home message was successfully relayed to the call home destination. In other embodiments, transmitting, from the BMC, the call home message to the call home destination includes transmitting the call home message independent from the management server.

In some embodiments, transmitting, from the BMC, the call home message to the call home destination includes transmitting the call home message to a proxy. The proxy relays the call home message to the call home destination. In other embodiments, transmitting, from the BMC, the call home message to the call home destination includes transmitting the call home message to a router in communication with the call home destination. In other embodiments, the operations include receiving, at the BMC, call home instructions from the management server. The call home instructions include an address of the call home destination, instructions for transmitting the call home message independent from the management server, and/or code to install the call home instructions on the BMC.

In some embodiments, the BMC is a first BMC, the management server is a first management server of a plurality of first management servers a second management server is in communication with each of the first management servers. Each first management server is in communication with a plurality of BMCs, each within a computing device. The first management server in communication with the first BMC relays the call home message received from the first BMC to the second management server and the second management server relays the call home message to the call home destination. In the embodiments, determining, at the first BMC, that the management server failed to receive the call home message and/or failed to successfully relay the call home message to the call home destination includes determining that the first management server and/or the second management server failed to receive the call home message, and/or the second management server failed to successfully relay the call home message to the call home destination.

A program product for an intelligent multi-path call home includes a non-transitory computer readable storage medium storing code. The code is configured to be executable by a processor to perform operations that include detecting, at a BMC, an error in a computing device managed by the BMC and sending, from the BMC, a call home message to a management server. The computing device is one of a plurality of computing devices each with a BMC in communication with the management server. The management server is programmed to relay the call home message to a call home destination remote from the computing devices and management server. The operations include determining, at the BMC, that the management server failed to receive the call home message and/or failed to successfully relay the call home message to the call home destination and transmitting, from the BMC, the call home message to the call home destination in response to determining that the management server failed to receive the call home message and/or failed to successfully relay the call home message to the call home destination.

In some embodiments, determining that the management server failed to receive the call home message and/or failed to successfully relay the call home message to the call home destination includes the BMC determining that transmission of the call home message to the management server failed, and/or the BMC failing to receive a message from the management server that the call home message was successfully relayed to the call home destination. In other embodiments, transmitting, from the BMC, the call home message to the call home destination includes transmitting the call home message to a proxy, wherein the proxy relays the call home message to the call home destination.

FIG. 1A is a schematic block diagram illustrating a system 100 for an intelligent multi-path call home, according to various embodiments. The system 100 includes a call home apparatus 102 in a baseboard management controller ("BMC") 104 where there is a BMC 104 in various computing devices of the system 100, such as servers 106 (e.g., server 1 106a, server 2 106b, ... server n 106n), storage devices 108 (e.g., storage device 1 108a ... storage device n 108n), switches 110, etc. in one or more server pods 115. The BMCs 104 are connected to a management server 112 over a management network 120. The server pods 115 and management server 112 are in depicted in a datacenter 116 but may be in another location. The servers 106, storage devices 108, switches 110, etc., in other embodiments, are not located in server pods 115.

The management server 112 manages the BMCs 104, which manage the computing devices (e.g., 106, 108, 110, etc.) in which they reside and the management server 112 communicates over an external management network 121 with a call home destination 118. The call home destination 118, in some embodiments, is a service center of a vendor supplying BMCs 104, servers 106, storage devices 108, switches 110, management servers 112, etc. for a datacenter 116 or other location. The service center and personnel receiving call home messages, in some embodiments, are able to respond to call home messages by filling out a service ticket, ordering equipment, sending repair personnel, etc. In some embodiments, the call home destination 118 is a remote management server which may be used by a system administrator or other user to manage and control the computing devices.

The computing devices (e.g., 106, 108, 110, etc.) of the system 100, in some embodiments, communicate with clients 122 and other devices over a computer network 124 separate than the external management network 121. In other embodiments, the management server 112 communicates with the call home destination 118 over the computer network 124. In such embodiments, the management server 112 communicates with the call home destination 118 using a secure communication method, such as encryption, a virtual private network ("VPN"), etc. In some embodiments, the external management network 121 uses some or all of elements in the computer network 124.

In some embodiments, the servers 106, storage devices 108, and switches 110 are rack-mounted equipment in a server pod 115. In other embodiments, one or more of the servers 106, storage devices 108, and switches 110 are not rack mounted. In some embodiments, the servers 106 are blade servers. The servers 106 may be desktop computers, workstations, a mainframe computer, or other type of server managed by a BMC 104. The storage devices 108 may be rack mounted, may be mounted in a cabinet, may be standalone, etc. The switches 110 may be rack-mounted, may reside in a cabinet, etc. The system 100 may also include other devices, such as power supplies, etc. that may be monitored by a BMC 104.

The call home destination 118, in some embodiments, is at a location of a vendor of some or all of the computing devices (e.g., 106, 108, 110, 112, 115) of the datacenter 116. The call home destination 118, in various embodiments, includes a desktop computer, a workstation, a laptop computer, a tablet computer, a rack-mounted computer, a cell phone, or other computing device capable of connecting with the management server 112. In some embodiments, the call home destination 118 is a remote management server. In some embodiments, a system administrator or other user connects with the call home destination 118 using a portable electronics device, a home computer, etc., which then allows the system administrator/user to access the management server 112. One of skill in the art will recognize other embodiments of a call home destination 118.

In some embodiments, the management network 120 within the datacenter 116 or other location is separated from the external management network 121 by a router 128. In some embodiments, the management network 120 is a private network, on a subnet, etc. and the router 128 has an external internet protocol ("IP") address known to the call home destination 118 and other devices connected to and part of the external management network 121 or computer network 124 and the router uses separate IP subnet addresses for the various BMCs 104 and computing devices of the datacenter 116 or other location behind the router 128. In some embodiments, the management network 120 includes switches, cables, and other network devices to facilitate communication between the BMCs 104, management server 112, router 128, etc. In embodiments described herein, the BMCs 104 are able to communicate with the call home destination 118 independent from the management server 112.

In some embodiments, the management network 120 includes a proxy 126 that combines data traffic to and from the BMCs 104 to a single stream. In other embodiments, the proxy 126 is not included in the system 100. In some embodiments, the single stream of communications from the BMCs 104 is directed to the management server 112. In other embodiments, the single stream of BMC communications is directed to the router 128. In some embodiments, the proxy 126 includes some firewall functions. In other embodiments, the router 128 includes a firewall. The proxy 126, in some embodiments, is called a proxy server. Using a proxy 126, in some embodiments, provides advantages, such as use as a firewall, a web filter, provides shared network connections, and may cache data to speed up common requests. In some embodiments, the proxy 126 and router 128 are combined. One of skill in the art will recognize other advantages of using a proxy 126.

A BMC 104 provides access to computing devices of the datacenter 116 through the management server 112. One example of a BMC 104 is a Lenovo® XClarity® Controller ("XCC"). The datacenter 116 includes one or more management servers 112 in communication with the BMCs 104 located in the various computing devices of the datacenter 116.

Typically, the BMC 104 is connected to an internal management network 120 and external management network 121 separate from a computer network 124 used by virtual machines ("VMs"), containers, servers 106, etc. for communications, workloads, etc. The BMCs 104 typically have access to various components of the servers 106 and other computing devices and are able to control the components, gather data, report alerts and data from the components and manage the components. In some embodiments, a BMC 104 is able to access components of a server 106 when the server 106 is not running and is often able to reboot the server 106. The BMC 104 may also access other computing devices when the other computing devices are not running.

In some embodiments, the BMCs 104 of the servers 106, storage devices 108, etc. are connected to a management server 112 that acts as a gateway for external communications. The management server 112, in some embodiments, is a Lenovo XClarity Administrator ("LXCA"). In some embodiments, the management server 112 is accessible over a private and/or secure connection. In some embodiments, a system administrator is able to access the management server 112 via virtual private network ("VPN") over a public computer network, such as the Internet. In other embodiments, the secure connection between the management server 112 and other devices, such as the call home destination 118, is implemented using another secure communications protocol.

The call home apparatus 102 in the BMCs 104 enables the BMCs 104 to send a message to the call home destination 118 independently from the management server 112 in situations where the management server 112 is unable to send the message. In some embodiments, each BMC 104 includes a function that gathers information about a problem with the computing device in which the BMC 104 is located. The problem may be failure of a component, errors indicative of a pending failure, overheating of a component, or other problems where gathering information about the problem and then reporting the information is beneficial. Often gathering information about a problem and sending the information is a "call home" function and the message regarding the problem is a "call home message." As used herein, a call home message is a message from a BMC 104 reporting a problem with the computing device (e.g., 106, 108, 110, etc.) in which the BMC 104 is installed. The call home apparatus 102, in some embodiments, includes an ability to determine if a call home message sent by the call home apparatus 102 to the management server 112 was successfully transmitted to the call home destination 118.

The management server 112, in some embodiments, includes a server call home apparatus 114 that enables the management server 112 to receive call home messages from the BMCs 104 and forward the call home messages to the call home destination 118. The server call home apparatus 114 includes information necessary to contact the call home destination 118, such as the address of the call home destination 118. The server call home apparatus 114 may also include keys, passwords, etc. used to access the call home destination 118. In some embodiments, the server call home apparatus 114 also includes a function to send a message to the BMC 104 from which a call home message was received that the call home message was successfully transmitted to the call home destination 118 or was not successfully transmitted to the call home destination 118. The call home apparatus 102 is described in more detail in the apparatuses 200, 300 of FIGS. 2 and 3 and the server call home apparatus 114 is described in more detail in the apparatus 300 of FIG. 3.

The management network 120, external management network 121, and computer network 124 include one or more network types, such as a LAN, a WAN, a fiber network, a cellular network, a fiber network, or the like. The management network 120, external management network 121, and/or computer network 124 include network devices, such as servers, switches, routers, cabling, patch panels, and the like. The management network 120 is located in the datacenter 116 or location where the computing equipment (e.g., 106, 108, 110, 112, 115, etc.) is located, but may include connections to allow system administrators and/or other users to access the management network 120 locally. The router 128 and/or proxy 126 provide a mechanism for a system administrator to access the management network 120 through the call home destination 118. The computer network 124, in some embodiments, includes the Internet and may include other networks, such as a LAN, a WAN, etc. and typically includes a higher bandwidth than the management network 120 and external management network 121 to allow servers 106 and other computing devices in the datacenter 116 to communicate at an appropriate scale with the clients 122.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 1B:
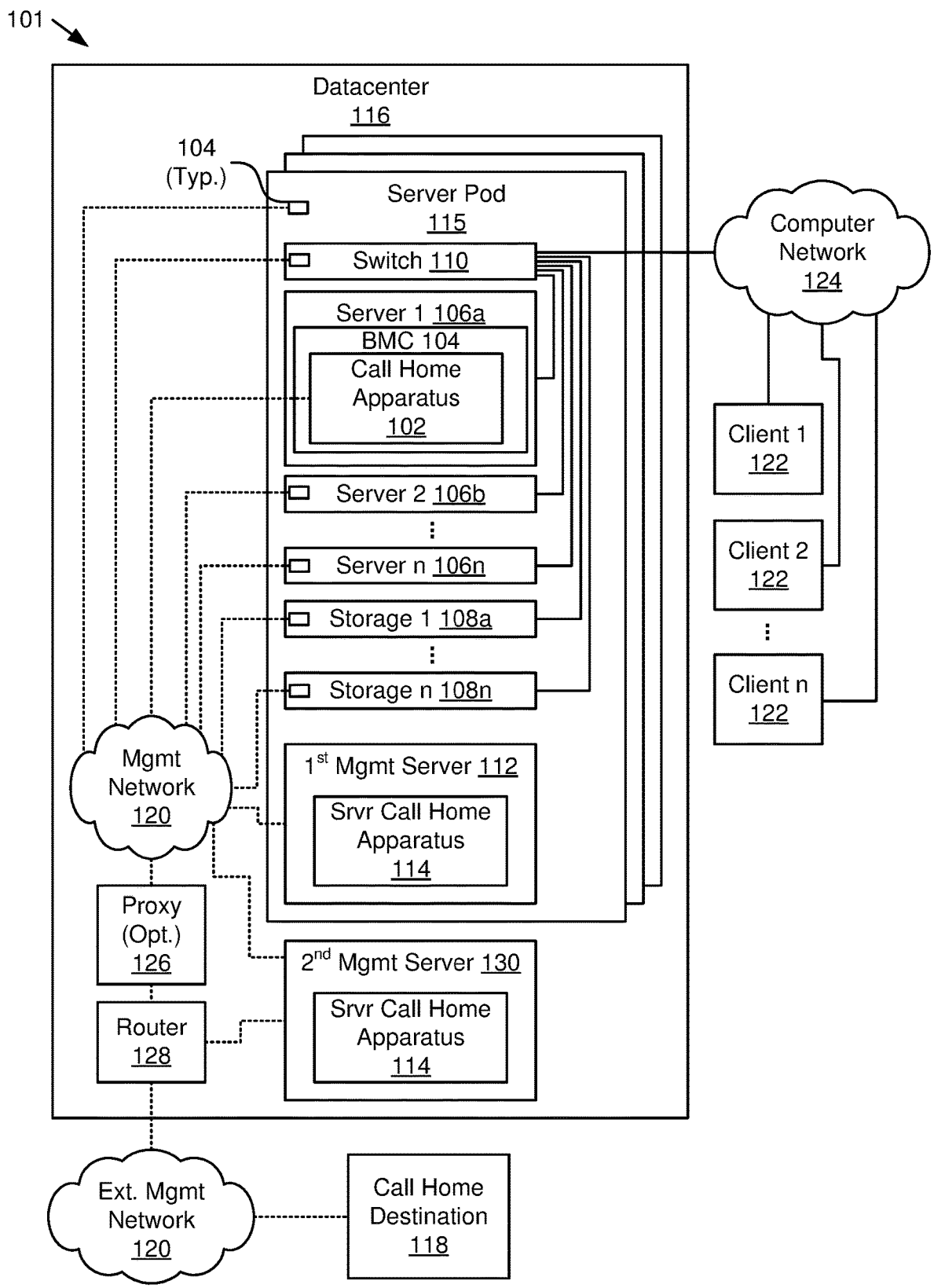
FIG. 1B is a schematic block diagram illustrating another system for an intelligent multi-path call home with multiple levels of management servers, according to various embodiments.

FIG. 1B is a schematic block diagram illustrating another system 101 for an intelligent multi-path call home with multiple levels of management servers, according to various embodiments. The system 101 of FIG. 1B is similar to the system 100 of FIG. 1A except that the management server 112 of system 101 of FIG. 1B is a first management server 112 in each server pod 115 and each first management server 112 connects to a second management server 130 which communicates with the call home destination 118. The system 101 of FIG. 1B, in some embodiments, is found in large datacenters 116 where a single management server 112 does not have capacity to manage all of the BMCs 104 in the datacenter 116. In some embodiments, the first management server 112 is an XClarity Administrator ("XCA") and the second management server 130 is an XClarity Orchestrator ("XCO") by Lenovo.

The call home apparatus 102 of the BMCs 104 of the system 101 of FIG. 1B send call home messages to the connected first management servers 112, which forward the call home messages to the second management server 130, which then forwards the call home messages to the call home destination 118 when working properly. In the system 101 of FIG. 1B, the call home apparatuses 102 differ from the call home apparatuses 102 of the system 101 of FIG. 1A in that the call home apparatuses 102 of the system 101 of FIG. 1B determine if a call home message is successfully transmitted through the first management server 112 to the second management server 130 and then to the call home destination 118. If transmission of the call home message fails anywhere along the pathway through both the first management server 112 and the second management server 130 and to the call home destination 118, the call home apparatus 102 transmits the call home message directly to the call home destination 118.

The system 101 of FIG. 1B includes a server call home apparatus 114 in both the first management server 112 and the second management server 130. However, the call home apparatus 114 in the first management server 112 is configured to transmit call home messages from the BMCs 104 to the second management server 130 and the server call home apparatus 114 in the second management server 130 is configured to receive call home messages from the first management servers 112 and to transmit received call home messages to the call home destination 118.

Figure 2:
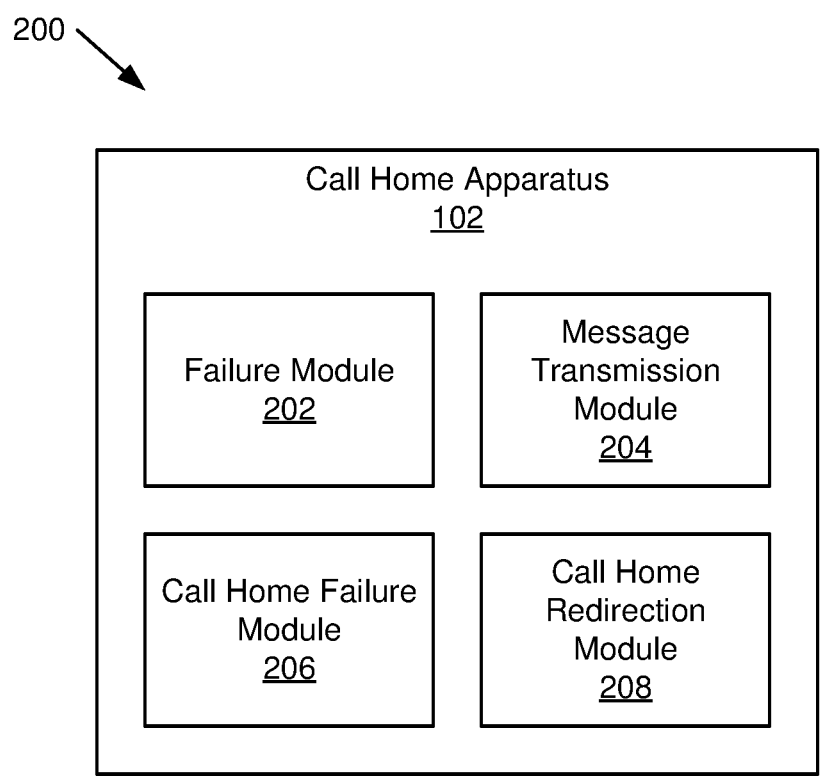
FIG. 2 is a schematic block diagram illustrating an apparatus for an intelligent multi-path call home, according to various embodiments.

FIG. 2 is a schematic block diagram illustrating an apparatus 200 for an intelligent multi-path call home, according to various embodiments. The apparatus 200 includes a call home apparatus 102 with a failure module 202, a message transmission module 204, a call home failure module 206, and a call home redirection module 208, which are described below. In some embodiments, the apparatus 200 is implemented with code stored on one or more computer readable storage media, which are non-transitory. In other embodiments, some or all of the apparatus 200 is implemented with a programmable hardware device, such as an FPGA, and some or all of the apparatus 200 may also be implemented with hardware circuits.

The apparatus 200 includes a failure module 202 configured to detect, at a BMC 104, an error in a computing device managed by the BMC 104. The computing device may be a server 106, a storage device 108, a switch 110, or other computing device managed by a BMC 104. The failure module 202 is configured to gather information about an error. The error, in some embodiments, is a failure of a component of the computing device or computing device itself. In other embodiments, the error includes signals, data, etc. that are abnormal and may indicate a failure, a future failure, etc. of a component of the computing device or the computing device itself. In other embodiments, the error includes environmental data, such as temperature, humidity, vibrations, etc. of a component in the computing device, from sensors within the computing device, or the like. The error includes any information deemed relevant to some type of a problem occurring in the computing device.

In some embodiments, the failure module 202 stores and/or saves information about an error. The failure module 202, in some embodiments, triggers storage and/or saving information about an error and associates the information with the error. Information from the error detected by the failure module 202, as used herein, is information to be included in a call home message. In some embodiments, the failure module 202 uses a first-in, first-out register, memory, etc. that stores information from sensors, registers, etc. of the computing device so that when the failure module 202 detects the error, the failure module 202 is able to save data from before, during, and/or after the error. The failure module 202, in some embodiments, selects an appropriate amount of information regarding the error to be included in a call home message. In some embodiments, the failure module 202 includes timestamp information with error information. One of skill in the art will recognize other ways for the failure module 202 to detect an error and to store and/or save information regarding the error.

The apparatus 200 includes a message transmission module 204 configured to send, from the BMC 104, a call home message to a management server 112. The computing device is one of a plurality of computing devices in the system 101, each with a BMC 104 in communication with the management server 112. The management server 112 is programmed to relay the call home message to a call home destination 118 that is remote from the computing devices and management server 112. In some embodiments, the failure module 202 detecting an error triggers the message transmission module 204 to send the call home message. In other embodiments, the message transmission module 204 periodically determines if an error exists, if a call home message is ready for transmission, etc.

In some embodiments, the message transmission module 204 communicates with the management server 112 over the management network 120 using an appropriate communication protocol, such as transmission control protocol ("TCP"), transmission control protocol/internet protocol ("TCP/IP"), or the like. In some embodiments, the management network 120 runs using a management network protocol, such as Redfish, Intelligent Platform Management Interface ("IPMI"), Simple Network Management Protocol ("SNMP"), Alert Standard Format ("ASF"), Hypertext Transfer Protocol ("HTTP"), Hypertext Transfer Protocol Secure ("HTTPS"), or the like and the message transmission module 204 uses the management network protocol to send the call home message to the management server 112.

The apparatus 200 includes a call home failure module 206 configured to determine, at the BMC 104, that the management server 112 failed to receive the call home message and/or failed to successfully relay the call home message to the call home destination 118. In some embodiments, the call home failure module 206 determines that the management server 112 failed to receive the call home message by the call home failure module 206 and/or the BMC 104 failing to establish communication with the management server 112. In other embodiments, the call home failure module 206 determines that the management server 112 failed to receive the call home message in response to the call home failure module 206 and/or the BMC 104 failing to receive an acknowledgement from the management server 112 of receipt of the call home message.

In some embodiments, the call home failure module 206 determines that the management server 112 failed to successfully relay the call home message to the call home destination 118 by the call home failure module 206 and/or the BMC 104 receiving a call home message failure message from the management server 112. In other embodiments, the call home failure module 206 determines that the management server 112 failed to successfully relay the call home message to the call home destination 118 after the call home failure module 206 and/or the BMC 104 failing to receive a successful transmission message from the management server 112, for example after a timeout period. One of skill in the art will recognize other ways for the call home failure module 206 to determine that the management server 112 failed to receive the call home message and/or failed to successfully relay the call home message to the call home destination 118.

The apparatus 200 includes a call home redirection module 208 configured to transmit, from the BMC 104, the call home message to the call home destination 118. The call home redirection module 208 transmits the call home message to the call home destination 118 independent from the management server 112. The call home redirection module 208 is configured to transmit the call home message to the call home destination 118 independent of the management servers 112, 130. In some embodiments, the call home redirection module 208 is configured to transmit the call home message to a proxy 126 and the proxy 126 relays the call home message to the call home destination 118. In other embodiments, the call home redirection module 208 is configured to transmit the call home message to a router 128 in communication with the call home destination 118 and the router 128 relays the call home message to the call home destination 118. In other embodiments, the call home redirection module 208 is configured to transmit the call home message to a proxy 126 and the proxy 126 relays the call home message to the router 128, which relays the call home message to the call home destination 118.

Figure 3:
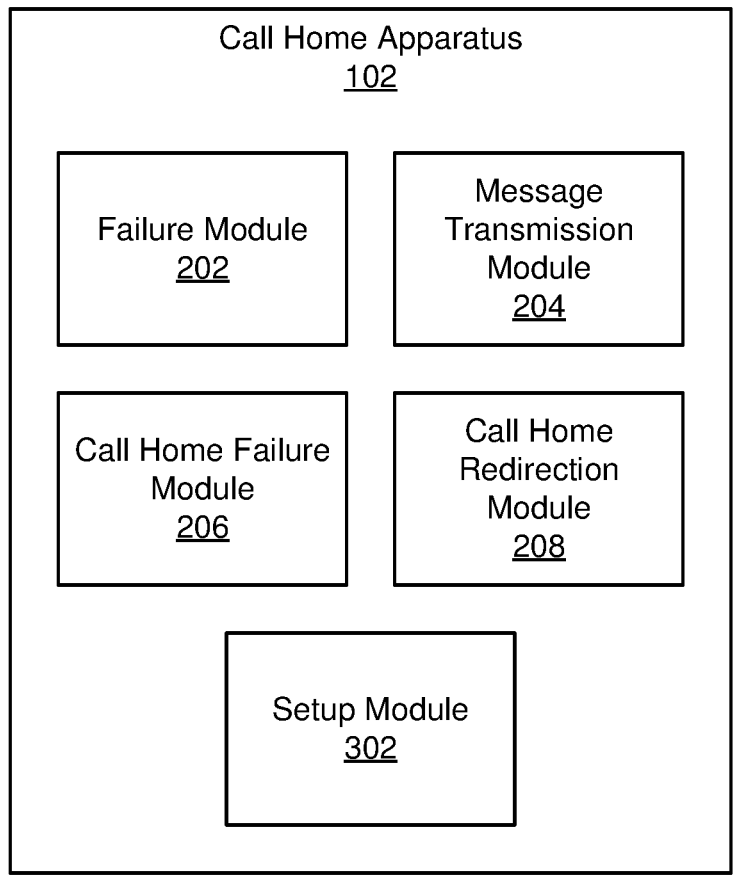
FIG. 3 is a schematic block diagram illustrating another apparatus for an intelligent multi-path call home, according to various embodiments.
Figure 3:
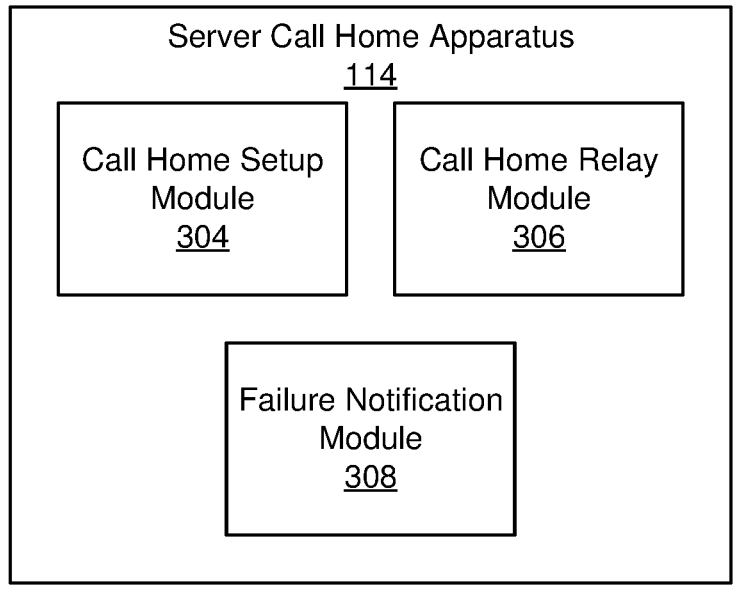

FIG. 3 is a schematic block diagram illustrating another apparatus 300 for an intelligent multi-path call home, according to various embodiments. The apparatus 300 includes a call home apparatus 102 with a failure module 202, a message transmission module 204, a call home failure module 206, and a call home redirection module 208, which are substantially similar to those described above in relation to the apparatus 200 of FIG. 2. The call home apparatus 102 also includes a setup module 302, which is described below. In various embodiments, the apparatus 300 also includes a server call home apparatus 114 with a call home setup module 304, a call home relay module 306, and/or a failure notification module 308, which are described below. In various embodiments, modules of the apparatus 300 are implemented similarly to the apparatus 200 of FIG. 2.

The apparatus 300 includes a setup module 302 configured to receive, at the BMC 104 where the call home apparatus 102 is located, call home instructions from the management server 112 or from another computing device. The call home instructions include an address of the call home destination 118, instructions for transmitting the call home message independent from the management servers 112, 130, and/or code to install the call home instructions on the BMC 104.

Where there is a single management server 112, as in FIG. 1A, the server call home apparatus 114 includes a call home setup module 304 configured to receive information from the call home destination 118 regarding how to set up a call home function on the management server 112 and the BMCs 104. The call home setup module 304 sets up the call home function on the management server 112 to enable the management server 112 to receive call home messages and to correctly relay the call home messages to the call home destination 118. The call home setup module 304 also sets up the call home relay module 306 to relay call home messages to the call home destination 118 and the failure notification module 308 to notify the BMC 104 sending a call home message that there was a failure and/or a success in relaying a call home message to the call home destination 118. In some embodiments, the call home setup module 304 sends instructions to the BMCs 104 to set up the call home apparatus 102 on the BMCs 104. The setup module 302 of the call home apparatus 102 for a BMC 104 sets up the call home functions of the failure module 202, the message transmission module 204, the call home failure module 206 and the call home redirection module 208, including a correct address of the call home destination 118.

The call home relay module 306 is configured to receive call home messages from a BMC 104 and then to relay the received call home messages to the call home destination 118. The failure notification module 308 of the server call home apparatus 114 is configured to, in some embodiments, notify the BMC 104 sending a call home message of a failure in transmitting the call home message to the call home destination 118. In some embodiments, the failure notification is based on a transmission failure. In other embodiments, the failure notification is based on failure to receive confirmation of delivery of a call home message.

In some embodiments, the failure notification module 308 is configured to send a call home success notification to the BMC 104 from which the management server 112 received the call home message. The call home success message, in some embodiments, is based on confirmation that the call home destination 118 received the call home message. In other embodiments, the call home success message is based on transmission of the call home message to the call home destination 118 without any transmission errors. In some embodiments, the failure notification module 308 or other element in the server call home apparatus 114 sends a confirmation of receipt of a call home message back to the BMC 104 sending the call home message.

In embodiments like the system 101 of FIG. 1B where there is a second management server 130 and more than one first management servers 112, the call home setup module 304 operates differently in that the call home setup module 304 in the second management server 130 receives the instructions for call home setup from the call home destination 118 and the call home setup module 304 in the first management servers 112 receive the call home setup instructions from the second management server 130. The call home setup modules in the first and second management servers 112, 130 set up the call home relay module 306 and the failure notification module 308 based on the two-level management server configuration.

The failure notification module 308 in the second management server 130 is configured, upon failure of transmission of a call home message to the call home destination 118, to send failure notifications and call home success notifications to the appropriate first management server 112, and the failure notification module 308 in the various first management servers 112 is configured to both relay failure/success notifications from the second management server 130 to an appropriate BMC 104 and to generate and send failure notifications to the appropriate BMC 104 for failures in relaying call home messages at the first management server 112. The call home relay module 306 in a two-level management server configuration relays call home messages up from a first management server 112 to a second management server 130, to the call home destination 118.

Figure 4:
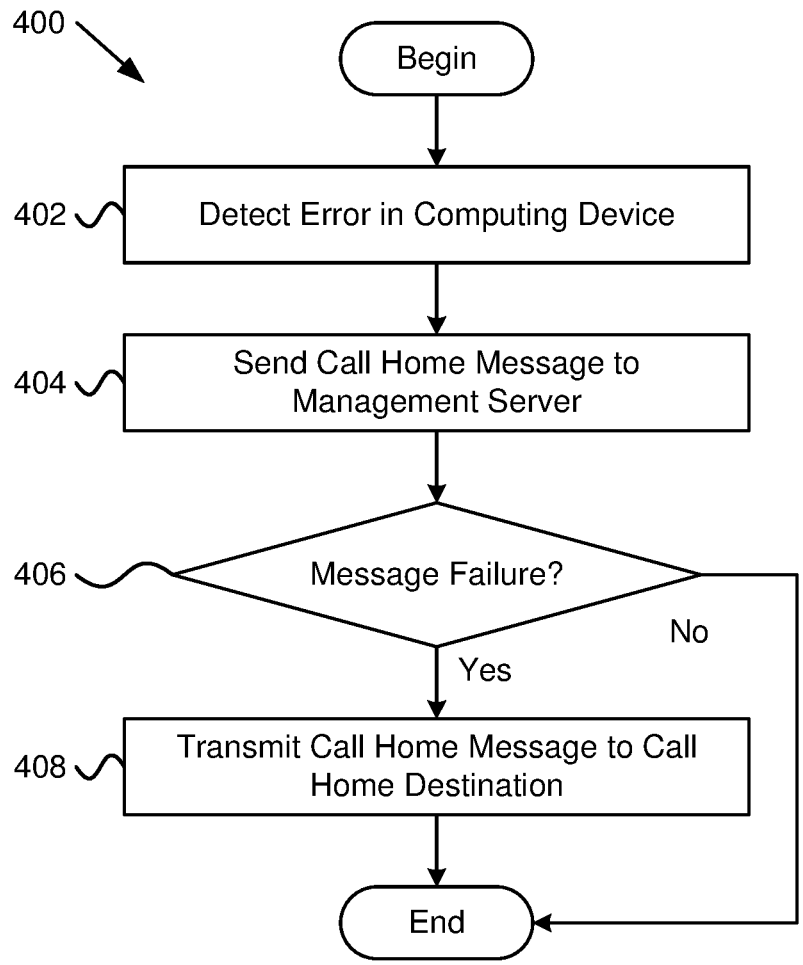
FIG. 4 is a schematic flow chart diagram illustrating a method for an intelligent multi-path call home, according to various embodiments.

FIG. 4 is a schematic flow chart diagram illustrating a method 400 for an intelligent multi-path call home, according to various embodiments. The method 400 begins and detects 402, at a BMC 104, an error in a computing device managed by the BMC 104 and sends 404, from the BMC 104, a call home message to a management server 112. The computing device is one of a plurality of computing devices each with a BMC 104 in communication with the management server 112. The management server 112 is programmed to relay the call home message to a call home destination 118 remote from the computing devices and management server 112.

The method 400 determines 406, at the BMC 104, that the management server 112 failed to receive the call home message and/or failed to successfully relay the call home message to the call home destination 118. If the method 400 determines 406 that the management server 112 failed to receive the call home message and/or failed to successfully relay the call home message to the call home destination 118, the method 400 transmits 408 the call home message to the call home destination 118, and the method 400 ends. If the method 400 determines 406 that the management server 112 successfully transmitted the call home message to the call home destination 118, the method 400 ends.

In some embodiments, the method 400 determines 406 that the management server 112 successfully transmitted the call home message to the call home destination 118 by receiving a call home success notification from the management server 112. In other embodiments, the method 400 determines 406 that the management server 112 failed to receive the call home message by either receiving a call home failure notification from the management server 112 or failing to receive a call home success notification from the management server 112 within a timeout period. One of skill in the art will recognize other ways for the method 400 to determine 406 whether or not the management server 112 successfully received a call home message and delivered the call home message to the call home destination 118. In various embodiments, all or a portion of the method 400 is implemented with the failure module 202, the message transmission module 204, the call home failure module 206, and/or the call home redirection module 208.

Figure 5:
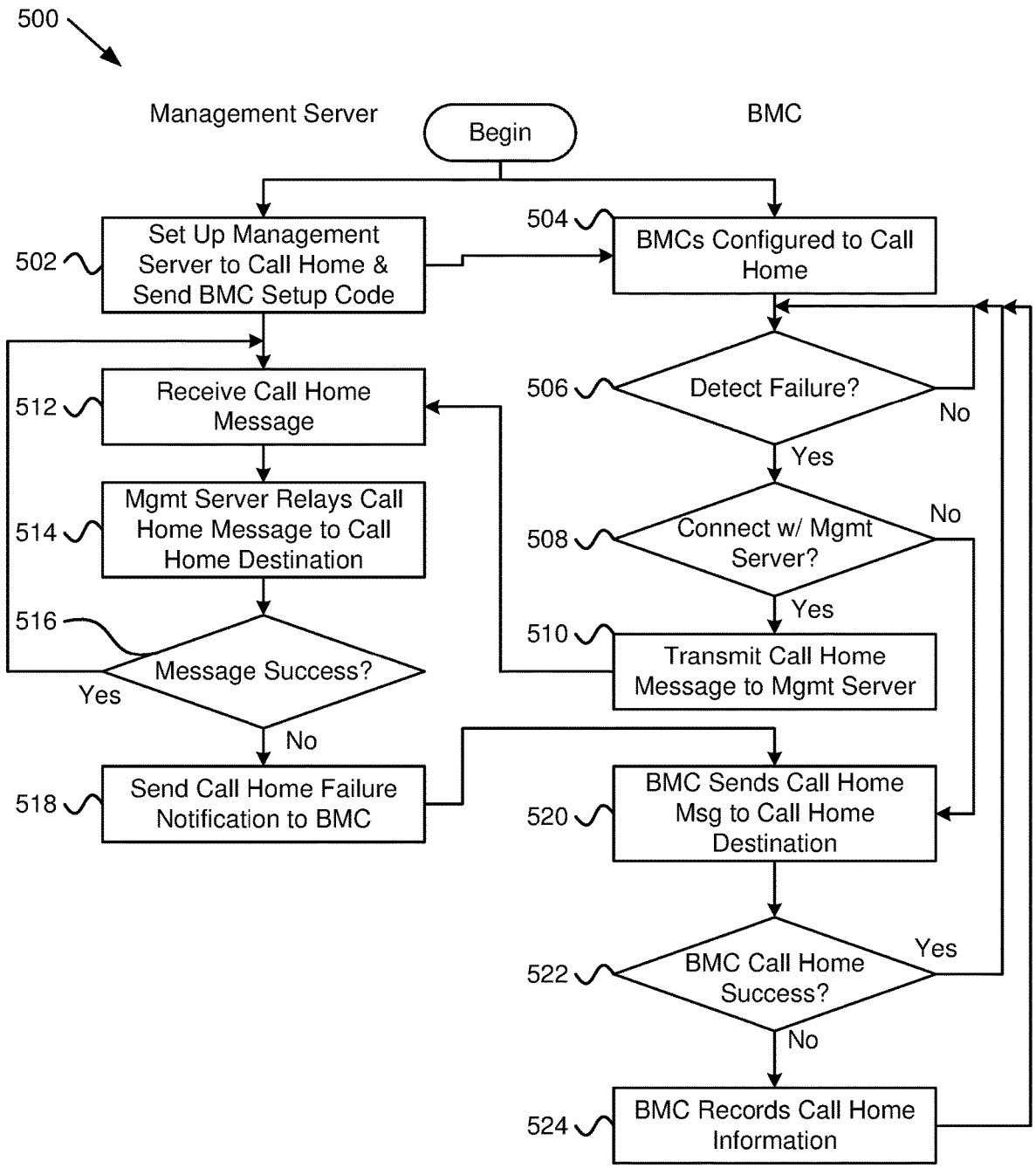
FIG. 5 is a schematic flow chart diagram illustrating another method for an intelligent multi-path call home, according to various embodiments.

FIG. 5 is a schematic flow chart diagram illustrating another method 500 for an intelligent multi-path call home, according to various embodiments. The method 500 begins and sets 502 up the management server 112 to call home and sends instructions (e.g., code) to the BMCs 104 to set up call home function. The method 500, at a BMC 104, configures 504, based on code sent from the management server 112, the BMC 104 to call home upon call home message failure. In addition, the method 500, based on the code, configures 504 the BMC 104 to connect to the management server 112 and to send a call home message to the management server 112. The method configures 504 the BMC 104, when the BMC 104 fails to connect to the management server 112 or receives a message from the management server 112 that transmission of the call home message has failed, to send the call home message directly to the call home destination 118. In other embodiments, the BMC 104 receives call home instructions from another source. At the BMC 104, the method 500 determines 506 if the BMC 104 has detected an error in a computing device managed by the BMC 104. If the method 500 determines 506 that an error has not been detected, the method 500 returns and continues to determine 506 if the BMC 104 has detected an error.

If the method 500 determines 506 that the BMC 104 has detected an error, the method 500 determines 508 if the BMC 104 is connected to the management server 112 for delivery of call home messages. If the method 500 determines 508 that the BMC 104 is connected to the management server 112, the method 500 transmits 510 a call home message to the management server 112.

The method 500, at the management server 112, receives 512 a call home message and relays 514 the call home message to the call home destination 118 and determines 516 if the call home message was successfully transmitted to the call home destination 118. If the method 500, determines 516 that the call home message was successfully transmitted to the call home destination 118, the method 500 returns and waits to receive 512 a call home message. In some embodiments, the method 500 sends (not shown) a call home success notification to the BMC 104. If the method 500, determines 516 that the call home message was not successfully transmitted to the call home destination 118, the method 500 sends 518 a call home failure notification to the BMC 104 and the method 500, at the BMC 104, transmits 520 the call home message to the call home destination 118.

The method 500, at the BMC 104, determines 522 if the BMC 104 successfully sent the call home message to the call home destination 118. If the method 500 determines 522 that the BMC 104 successfully sent the call home message to the call home destination 118, the method 500 returns and determines 506 if the BMC 104 has detected an error. If the method 500 determines 522 that the BMC 104 successfully sent the call home message to the call home destination 118, the method 500 records 524, at the BMC 104, information from the call home message and returns and determines 506 if the BMC 104 has detected an error. The recorded information, in some embodiments, is available for a system administrator to download, view, etc. or for the method 500 to transmit to the call home destination 118 at a later time when communication is reestablished.

If the method 500 determines 508 that the BMC 104 is not connected to the management server 112, the method 500 transmits 520, from the BMC 104, the call home message to the call home destination 118 and returns and determines 506 if the BMC 104 has detected an error. In various embodiments, all or a portion of the method 500 is implemented with the failure module 202, the message transmission module 204, the call home failure module 206, the call home redirection module 208, the setup module 302, the call home setup module 304, the call home relay module 306, and/or the failure notification module 308.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting, at a baseboard management controller ("BMC"), an error in a computing device managed by the BMC;
   sending, from the BMC, a call home message to a management server, the computing device comprising one of a plurality of computing devices each with a BMC in communication with the management server, wherein the management server is programmed to relay the call home message to a call home destination remote from the computing devices and management server;
   determining, at the BMC, that the management server failed to receive the call home message and/or failed to successfully relay the call home message to the call home destination; and
   transmitting, from the BMC, the call home message to the call home destination in response to determining that the management server failed to receive the call home message and/or failed to successfully relay the call home message to the call home destination.

2. The method of claim 1, wherein determining that the management server failed to receive the call home message and/or failed to successfully relay the call home message to the call home destination comprises the BMC determining that transmission of the call home message to the management server failed.

3. The method of claim 1, wherein determining that the management server failed to receive the call home message and/or failed to successfully relay the call home message to the call home destination comprises the BMC failing to receive a message from the management server that the call home message was successfully relayed to the call home destination.

4. The method of claim 1, wherein transmitting, from the BMC, the call home message to the call home destination comprises transmitting the call home message independent from the management server.

5. The method of claim 1, wherein transmitting, from the BMC, the call home message to the call home destination comprises transmitting the call home message to a proxy, wherein the proxy relays the call home message to the call home destination.

6. The method of claim 1, wherein transmitting, from the BMC, the call home message to the call home destination comprises transmitting the call home message to a router in communication with the call home destination.

7. The method of claim 1, further comprising receiving, at the BMC, call home instructions from the management server, wherein the call home instructions comprise an address of the call home destination, instructions for transmitting the call home message independent from the management server, and/or code to install the call home instructions on the BMC.

8. The method of claim 1, wherein the BMC communicates with the management server and the call home destination over a management network separate from a network used by the computing devices to transmit data.

9. The method of claim 1, wherein the BMC comprises a first BMC, the management server comprises a first management server of a plurality of first management servers and wherein a second management server is in communication with each of the first management servers, each first management server in communication with a plurality of BMCs, each within a computing device:
   wherein the first management server in communication with the first BMC relays the call home message received from the first BMC to the second management server and the second management server relays the call home message to the call home destination,
   wherein determining, at the first BMC, that the management server failed to receive the call home message and/or failed to successfully relay the call home message to the call home destination comprises determining that the first management server and/or the second management server failed to receive the call home message, and/or the second management server failed to successfully relay the call home message to the call home destination.

10. An apparatus comprising:
    a processor; and
    non-transitory computer readable storage media storing code, the code
      being executable by the processor to perform operations comprising:
        detecting, at a baseboard management controller ("BMC"), an error in a computing device managed by the BMC;
        sending, from the BMC, a call home message to a management server, the computing device comprising one of a plurality of computing devices each with a BMC in communication with the management server, wherein the management server is programmed to relay the call home message to a call home destination remote from the computing devices and management server;
        determining, at the BMC, that the management server failed to receive the call home message and/or failed to successfully relay the call home message to the call home destination; and
        transmitting, from the BMC, the call home message to the call home destination in response to determining that the management server failed to receive the call home message and/or failed to successfully relay the call home message to the call home destination.

11. The apparatus of claim 10, wherein determining that the management server failed to receive the call home message and/or failed to successfully relay the call home message to the call home destination comprises the BMC determining that transmission of the call home message to the management server failed.

12. The apparatus of claim 10, wherein determining that the management server failed to receive the call message and/or failed to successfully relay the call home message to the call home destination comprises the BMC failing to receive a message from the management server that the call home message was successfully relayed to the call home destination.

13. The apparatus of claim 10, wherein transmitting, from the BMC, the call home message to the call home destination comprises transmitting the call home message independent from the management server.

14. The apparatus of claim 10, wherein transmitting, from the BMC, the call home message to the call home destination comprises transmitting the call home message to a proxy, wherein the proxy relays the call home message to the call home destination.

15. The apparatus of claim 10, wherein transmitting, from the BMC, the call home message to the call home destination comprises transmitting the call home message to a router in communication with the call home destination.

16. The apparatus of claim 10, the operations further comprising receiving, at the BMC, call home instructions from the management server, wherein the call home instructions comprise an address of the call home destination, instructions for transmitting the call home message independent from the management server, and/or code to install the call home instructions on the BMC.

17. The apparatus of claim 10, wherein the BMC comprises a first BMC, the management server comprises a first management server of a plurality of first management servers and wherein a second management server is in communication with each of the first management servers, each first management server in communication with a plurality of BMCs, each within a computing device:
  wherein the first management server in communication with the first BMC relays the call home message received from the first BMC to the second management server and the second management server relays the call home message to the call home destination,
  wherein determining, at the first BMC, that the management server failed to receive the call home message and/or failed to successfully relay the call home message to the call home destination comprises determining that the first management server and/or the second management server failed to receive the call home message, and/or the second management server failed to successfully relay the call home message to the call home destination.

18. A program product comprising a non-transitory computer readable storage medium storing code, the code being configured to be executable by a processor to perform operations comprising:
  detecting, at a baseboard management controller ("BMC"), an error in a computing device managed by the BMC;
  sending, from the BMC, a call home message to a management server, the computing device comprising one of a plurality of computing devices each with a BMC in communication with the management server, wherein the management server is programmed to relay the call home message to a call home destination remote from the computing devices and management server;
  determining, at the BMC, that the management server failed to receive the call home message and/or failed to successfully relay the call home message to the call home destination; and
  transmitting, from the BMC, the call home message to the call home destination in response to determining that the management server failed to receive the call home message and/or failed to successfully relay the call home message to the call home destination.

19. The program product of claim 18, wherein determining that the management server failed to receive the call home message and/or failed to successfully relay the call home message to the call home destination comprises:
  the BMC determining that transmission of the call home message to the management server failed; and/or
  the BMC failing to receive a message from the management server that the call home message was successfully relayed to the call home destination.

20. The program product of claim 18, wherein transmitting, from the BMC, the call home message to the call home destination comprises transmitting the call home message to a proxy, wherein the proxy relays the call home message to the call home destination.

* * * * *